(12) United States Patent
Ying et al.

(10) Patent No.: US 12,452,133 B2
(45) Date of Patent: Oct. 21, 2025

(54) METHOD FOR DIRECTED NETWORK DETECTION, COMPUTER-READABLE STORAGE MEDIUM, AND RELATED DEVICE

(71) Applicant: Tencent Technology (Shenzhen) Company Limited, Guangdong (CN)

(72) Inventors: Qiufang Ying, Shenzhen (CN); Hao Zhang, Shenzhen (CN); Qiaoling Zheng, Shenzhen (CN); Bin Hu, Shenzhen (CN); Zhilin Shi, Shenzhen (CN); Jihong Zhang, Shenzhen (CN); Xiaosen Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 347 days.

(21) Appl. No.: 17/703,851

(22) Filed: Mar. 24, 2022

(65) Prior Publication Data

US 2022/0217054 A1    Jul. 7, 2022

Related U.S. Application Data

(63) Continuation of application No. PCT/CN2020/133853, filed on Dec. 4, 2020.

(30) Foreign Application Priority Data

Feb. 19, 2020  (CN) .......................... 202010101398.3

(51) Int. Cl.
*H04L 41/12* (2022.01)
*H04L 41/142* (2022.01)

(52) U.S. Cl.
CPC ............ *H04L 41/12* (2013.01); *H04L 41/142* (2013.01)

(58) Field of Classification Search
CPC ... H04L 41/12; H04L 41/142; H04L 43/0876; G06F 7/14; G06F 40/20
See application file for complete search history.

(56) References Cited

U.S. PATENT DOCUMENTS

| 4,953,106 A | * | 8/1990 | Gansner | ................ G06T 11/206 700/83 |
| 11,720,600 B1 | * | 8/2023 | Dixit | ..................... G06N 20/00 707/738 |

(Continued)

FOREIGN PATENT DOCUMENTS

| CN | 103412912 A | 11/2013 |
| CN | 103906271 A | 7/2014 |

(Continued)

OTHER PUBLICATIONS

Idwan et al.; Dijkstra Algorithm Heuristic Approach for Large Graph; 2011; Asian Network for Scientific Information; pp. 2255-2259. (Year: 2011).*

(Continued)

*Primary Examiner* — Muhammad Raza
(74) *Attorney, Agent, or Firm* — ArentFox Schiff LLP (57) ABSTRACT

A method for detecting node types in a directed network is provided. In the method, flow direction feature information of data traffic between network nodes in the directed network is acquired. The flow direction feature information includes a directed graph of nodes representing the network nodes. Layer scores of the nodes in the directed graph are determined based on whether the directed graph includes a directed cycle. The node types of the network nodes represented by the nodes in the directed network are determined according to the layer scores of the nodes.

17 Claims, 4 Drawing Sheets

(56) References Cited

U.S. PATENT DOCUMENTS

| | | | |
|---|---|---|---|
| 2006/0287842 A1* | 12/2006 | Kim | G01N 29/0609 |
| | | | 702/183 |
| 2008/0034074 A1 | 2/2008 | Becker | |
| 2009/0018880 A1* | 1/2009 | Bailey | G06Q 40/04 |
| | | | 705/7.37 |
| 2014/0136468 A1* | 5/2014 | Faratin | G06N 5/025 |
| | | | 706/55 |
| 2015/0370556 A1* | 12/2015 | Strosaker | G06F 8/75 |
| | | | 717/123 |
| 2016/0080202 A1* | 3/2016 | Zhang | H04L 41/0813 |
| | | | 709/223 |
| 2017/0300830 A1* | 10/2017 | Kadav | G06F 15/17312 |
| 2017/0302530 A1* | 10/2017 | Wolting | H04L 41/08 |
| 2018/0088937 A1* | 3/2018 | Tamir | G06F 8/433 |
| 2019/0050734 A1* | 2/2019 | Li | G06N 3/04 |
| 2019/0361861 A1* | 11/2019 | Rogynskyy | H04L 41/082 |
| 2021/0194907 A1* | 6/2021 | Bertiger | H04L 43/0811 |

FOREIGN PATENT DOCUMENTS

| | | |
|---|---|---|
| CN | 104867055 A | 8/2015 |
| CN | 106682986 A | 5/2017 |
| CN | 111314138 A | 6/2020 |

OTHER PUBLICATIONS

International Search Report and Written Opinion issued Mar. 1, 2021 in Application No. PCT/CN2020/133853 with English Translation.

Kahn, Arthur B. (1962), "Topological sorting of large networks", Communications of the ACM, 5 (11): 558-562, doi:10.1145/368996.369025.

Malliaros, Fragkiskos D.; Giatsidis, Christos; Papadopoulos, Apostolos N.; Vazirgiannis, Michalis (2019), "The core decomposition of networks: theory, algorithms and applications", The VLDB Journal, doi:10.1007/s00778-019-00587-4.

* cited by examiner

METHOD FOR DIRECTED NETWORK DETECTION, COMPUTER-READABLE STORAGE MEDIUM, AND RELATED DEVICE

RELATED APPLICATIONS

This application is a continuation of International Application No. PCT/CN2020/133853, entitled "METHOD FOR DETECTING DIRECTED NETWORK, COMPUTER-READABLE STORAGE MEDIUM, AND RELATED DEVICE" and filed on Dec. 4, 2020, which claims priority to Chinese Patent Application No. 202010101398.3, entitled "METHOD FOR DETECTING DIRECTED NETWORK, COMPUTER-READABLE STORAGE MEDIUM, AND RELATED DEVICE" and filed on Feb. 19, 2020. The entire disclosures of the prior applications are hereby incorporated by reference in their entirety.

FIELD OF THE TECHNOLOGY

This application relates to the field of information processing technologies, including to a method for detecting a directed network, a computer-readable storage medium, and a related device.

BACKGROUND OF THE DISCLOSURE

Multiple network nodes are deployed in a network, and each network node has different functions in specific applications. According to the direction of the data flow between these network nodes, these network nodes can be represented by a directed graph, such as a directed acyclic graph (DAG) or a n-DAG graph.

In many cases, network nodes need to be analyzed, for example, to determine the relationship between network nodes or to classify network nodes. However, the analysis of network nodes is often low in accuracy.

SUMMARY

According to various embodiments provided in this disclosure, a method for detecting a directed network, a non-transitory computer-readable storage medium, and a related device are provided.

One aspect of this disclosure provides a method for detecting node types in a directed network. In the method, flow direction feature information of data traffic between network nodes in the directed network is acquired. The flow direction feature information includes a directed graph of nodes representing the network nodes. Layer scores of the nodes in the directed graph are determined based on whether the directed graph includes a directed cycle. The node types of the network nodes represented by the nodes in the directed network are determined according to the layer scores of the nodes.

Another aspect of this disclosure provides an apparatus, including processing circuitry. The processing circuitry is configured to acquire flow direction feature information of data traffic between network nodes in the directed network. The flow direction feature information includes a directed graph of nodes representing the network nodes. The processing circuitry is configured to determine layer scores of the nodes in the directed graph based on whether the directed graph includes a directed cycle, and determine the node types of the network nodes represented by the nodes in the directed network according to the layer scores of the nodes.

Another aspect of this disclosure provides one or more non-transitory computer-readable storage mediums storing instructions which when executed by at least one processor cause the at least one processor to perform the method for detecting the node types of the directed network.

Another aspect of this disclosure provides a computer device, including a memory and a processor, the memory storing computer-readable instructions, the computer-readable instructions, when executed by the processor, causing the processor to perform the method for detecting node types of the directed network.

Details of one or more embodiments of this disclosure are provided in the subsequent accompanying drawings and descriptions. Other features, objectives, and advantages of this disclosure are illustrated in the specification, the accompanying drawings, and the claims.

BRIEF DESCRIPTION OF THE DRAWINGS

To describe the technical solutions in the embodiments of this disclosure, the following briefly describes the accompanying drawings required for describing the embodiments. The accompanying drawings in the following description show only some embodiments of this disclosure, and a person of ordinary skill in the art may derive other drawings from the accompanying drawings.

DESCRIPTION OF EMBODIMENTS

The technical solutions in embodiments of this disclosure are more clearly described in the following with reference to the accompanying drawings in the embodiments of this disclosure. The described embodiments are merely some rather than all of the embodiments of this disclosure. Other embodiments obtained by a person of ordinary skill in the art based on the embodiments of this disclosure shall fall within the protection scope of this disclosure.

In the specification, claims, and accompanying drawings of this disclosure, the terms "first", "second", "third", "fourth", and so on (if existing) are intended to distinguish between similar objects rather than describe a specific order or sequence. It is to be understood that data used in this way is interchangeable in a suitable case, so that the embodiments of this disclosure described herein can be implemented in a sequence in addition to the sequence shown or described herein. Moreover, the terms "include", "comprise" and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, system, product, or device.

Figure 1:
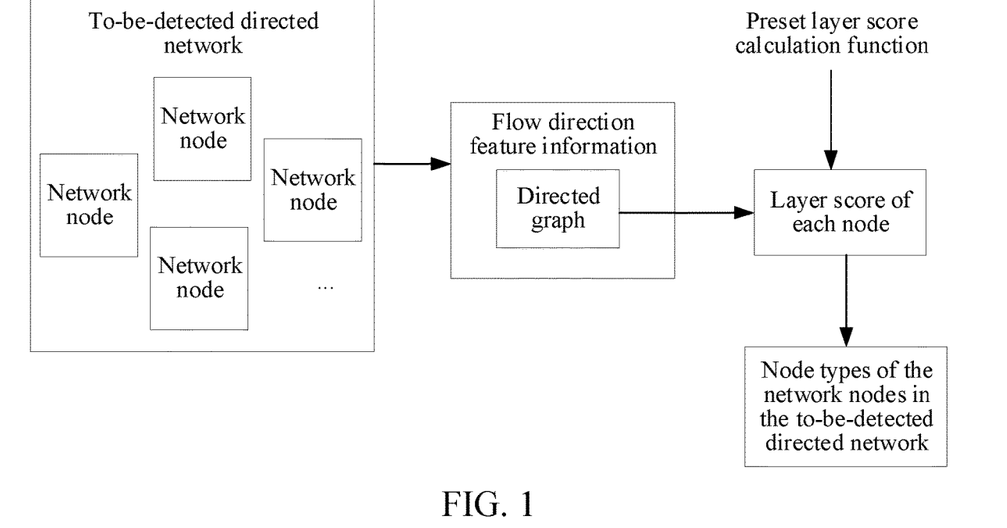
FIG. 1 is a schematic diagram of a method for detecting a directed network according to an embodiment of this disclosure.

The embodiments of this disclosure provide a method for detecting a directed network, which can obtain the type of a network node. In related technologies, feature information of a directed graph, e.g., linear sorting of nodes in the directed graph, can be obtained by certain computing methods such as a topological sorting algorithm based on a DAG graph, so as to obtain the relationship between network nodes represented by the directed graph. Specifically, the topological sorting algorithm mainly includes acquiring a linear sequence of all nodes in the DAG graph. In the linear sequence, each node appears and only appears once, and if there is a path from node A to node B, node A appears in front of node B in the linear sequence. In the embodiments of this disclosure, mainly the node type of each network node in the directed network is detected. As shown in FIG. 1, an apparatus for detecting a directed network can realize the detection of the network nodes by performing the following steps:

Flow direction feature information of data traffic between network nodes in a to-be-detected directed network is acquired, the flow direction feature information including a directed graph, and any node in the directed graph representing one network node. A layer score of each node in the directed graph is calculated according to a preset layer score calculation function when the directed graph does not include any directed cycle, the layer score of any node in the directed graph being used for representing an average path length of all paths from peripheral nodes in the directed graph to the any node. Node types of the network nodes represented by the nodes in the to-be-detected directed network are determined according to the layer scores of the nodes respectively.

In an example of the to-be-detected directed network, there is data traffic in a certain direction between network nodes included in the network, such as a fund transaction network, etc. Correspondingly, the network nodes may be payment terminals of users and the like.

In this way, the sequence of the nodes in the directed graph are quantified by layer scores. The calculation of the layer score of each node can comprehensively consider all paths to each network node in the directed network, so that the calculated layer scores can more accurately reflect the rankings of the network nodes, and the node type of each network node can be determined more accurately.

The method for detecting a directed network provided by the embodiments of this disclosure can be applied to a content push scenario. A network node may represent a commodity/service provider, and the commodity/service provider may be a merchant that provides at least one of a commodity or a service. The directed network graph may be a fund transaction network. In the process of acquiring a directed network graph, commodity/service providers that have fund transactions within a preset time period may be obtained to form a directed network graph. The node type may represent a level of the commodity/service provider, for example, an agent level in an agent distribution mode. The layer score is positively correlated with the level of the commodity/service provider. The higher the layer score, the higher the level. For example, when the layer score is a, the agent level is level 1, and when the layer score is b, the agent level is level 2, where b is greater than a, and level 2 is higher than level 1.

After the level of the commodity/service provider is obtained, target function push information corresponding to the commodity/service provider may be determined from candidate function push information according to the level of the commodity/service provider, and the target function push information is pushed to the terminal corresponding to the commodity/service provider, thereby improving the push accuracy. The function push information is push information of a function related to the commodity/service. For example, the function push information may be push information corresponding to a transfer assistant function, an automatic payment collection function, or a ledger function. The transfer assistant is a functional application that provides a transfer service for the commodity/service provider. By the automatic payment collection function, when a payment from another user is received, the payment can be automatically collected. By the ledger function, automatic bookkeeping can be implemented.

When receiving an operation for selecting the target function push information, the terminal sends response information to a server. The server may establish a correspondence between the commodity/service provider and a target function corresponding to the target function push information based on the response information, so that a function entry of the target function is displayed on the application of the terminal of the commodity/service provider, allowing the commodity/service provider to quickly use the target function through the function entry.

For example, in the agent distribution mode, for an agent with an agent level lower than a first preset level, such as a retailer, due to the large number of transactions, the agent often needs to receive payments. In this case, the corresponding target function is set to the automatic payment collection function in the server, so that the push information corresponding to the automatic payment collection function can be pushed to a terminal corresponding to this agent. For an agent with an agent level higher than the first preset level, such as an agent that is one level higher than the retailer level, the function push information corresponding to the transfer assistant function may be pushed.

The method for detecting a directed network provided by the embodiments of this disclosure can be applied to user identification scenarios in the financial field to identify the types of users, for example, to identify whether a user is a malicious user in the financial field. The malicious user may be, for example, a user who commits money laundering, credit card cashing, or a fraud. A network node may represent a user, and when the layer score is greater than a preset layer score, it is determined that the user is a malicious user. For example, for money laundering, a user is usually involved in multiple money laundering chains. The users in the money laundering chain are bottom-up. When a user is involved in multiple paths (links), the longer the paths involved and the more the paths involved, the higher the layer score, indicating a higher possibility that the user is a user who commits money laundering.

In the scenario of identifying user types, the directed network graph may also be a fund transaction network. In the process of acquiring a directed network graph, users that have fund transactions within a preset time period may be obtained to form a directed network graph.

Figure 2:
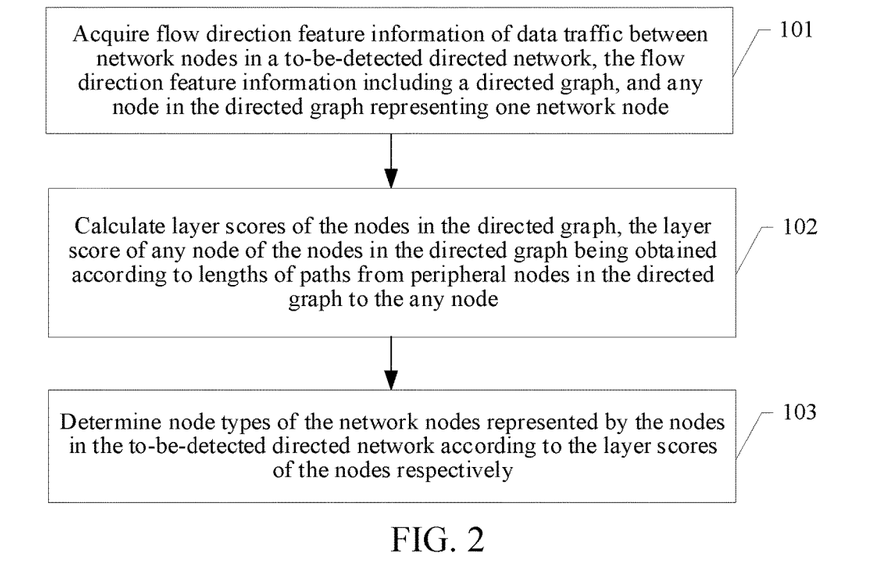
FIG. 2 is a flowchart of a method for detecting a directed network according to an embodiment of this disclosure.

An embodiment of this disclosure provides a method for detecting a directed network, which can be a method executed by an apparatus for detecting a directed network. A flowchart of the method is shown in FIG. 2. The method can include the following steps.

In step 101, flow direction feature information of data traffic between network nodes in a to-be-detected directed network is acquired, the flow direction feature information including a directed graph, and any node in the directed graph representing one network node.

An apparatus for detecting a directed network may be deployed in the network to detect data traffic between network nodes in the directed network according to a certain period, and obtain flow direction feature information, thereby initiating the process of this embodiment. Alternatively, the apparatus for detecting a directed network may perform the process of this embodiment offline after acquiring information in the directed network.

In this embodiment, the flow direction feature information may include a directed graph. The directed graph may include a plurality of nodes. Edges pointing to a certain direction may exist between some nodes, and can be referred to as directed edges. A directed edge may represent that data traffic in a certain direction exists between two network nodes. A flow direction weight value may be set for each directed edge. The flow direction weight value can represent a data content in a certain direction between two related nodes. For example, if the directed network is a fund transaction network, the flow direction weight value may represent the amount of funds or the number of transactions between the two transaction terminals. The flow direction weight value may also be determined by combining the amount of funds and the number of transactions. For example, a first weight is determined according to the amount of funds, a second weight is determined according to the number of transactions, and the first weight and the second weight are summed to obtain the flow direction weight value. The amount of funds is correlated with the weight value, and the number of transactions is positively correlated with the weight value. In a directed graph, an edge associated with a node is an outgoing edge or an incoming edge, and two nodes associated with a directed edge are a start point and an end point respectively.

Directed graphs may include directed acyclic graphs (DAGs) and non-DAG graphs. If a path starting from a node and passing through several directed edges does not return to the node in a directed graph, the directed graph is called a DAG graph. A DAG graph can be transformed into a directed tree. If a path starting from a node and passing through several directed edges does return to the node to form a cycle in a directed graph, the directed graph is called a non-DAG, which is a directed cyclic graph.

Figure 3:
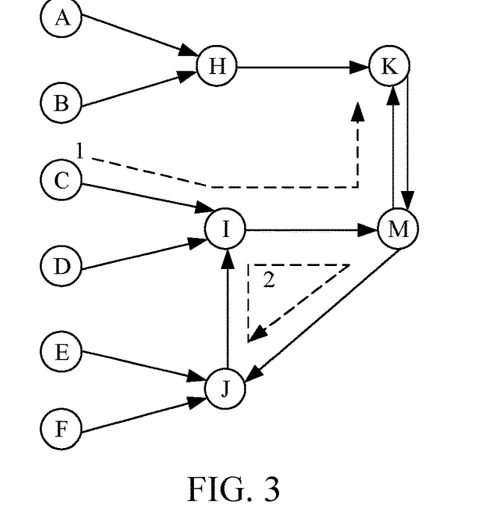
FIG. 3 is a schematic diagram of a directed graph determined according to an embodiment of this disclosure.

For example, the directed graph shown in FIG. 3 includes node A to node F, node H to node K, and node M, the path from node C→node I→node M→node K, as shown by dashed arrow 1 in the figure, does not form a directed cycle, and the path from node J→node I→node M→node J, as shown by dashed arrow 2 in the figure, forms a directed cycle.

In step 102, a layer score of each node in the directed graph is calculated, the layer score of any node in the directed graph being obtained according to lengths of paths from peripheral nodes in the directed graph to the any node.

In this embodiment, the layer score is obtained according to lengths of paths from peripheral nodes in the directed graph to the any node. The layer score is positively correlated with the path length, that is, the larger the path length, the greater the layer score. For example, the layer score of any node may be used for representing an average length of all paths from the peripheral nodes to the any node in the graph. The path length may be obtained according to at least one of the number of edges or weights of the edges, for example, may be represented by the number of edges or may be represented by the weights of the edges.

In this embodiment, different methods may be used to calculate the layer score of each node in the directed cycle and the non-directed cycle in the directed graph, and the finally obtained layer score of any node may be a non-negative rational number.

(1) When the directed graph does not include any directed cycle, a layer score of each node in the directed graph may be calculated according to a preset layer score calculation function.

For example, the computer device may calculate an average length value of the paths from the peripheral nodes in the directed graph to each node, to obtain the layer score of the each node in the directed graph. Alternatively, the computer device may calculate a sum of flow direction weight values corresponding to each path from the peripheral nodes in the directed graph to the any node to obtain a path weight value; and calculate an average value of the path weight values of the paths from the peripheral nodes and the any node, to obtain the layer score of the any node in the directed graph. That is, the layer score calculation function here may include: the layer score of any node is an average length value of all paths from the peripheral nodes in the directed graph to the any node, or the layer score of any node is a function-calculated value, e.g., a weighted average value, of lengths of all paths from the peripheral nodes in the directed graph to the any node. The peripheral nodes refer to nodes with zero in-degree in the directed graph, that is, the nodes at the lowest level in the directed graph. The weighted average value may refer to a value obtained by averaging the path weight values of the paths. The path weight value of any path may be a sum of flow direction weight values involved in the path.

For example, the in-degree of each of node A to node F shown in FIG. 3 is zero, that is, are peripheral nodes in the directed graph. For node K, all paths to node K include: node A—node H—node K, with a path length of 2, where the path weight value of the path is a sum a1 of a flow direction weight value from node A to node H and a flow direction weight value from node H to node K; node B—node H—node K, with a path length of 2, where the path weight value of the path is a sum a2 of a flow direction weight value from node B to node H and a flow direction weight value from node H to node K; node C—node I—node M—node K, with a path length of 3, where the path weight value of the path is a sum a3 of a flow direction weight value from node C to node I, a flow direction weight value from node I to node M, and a flow direction weight value from node M to node K; node D—node I—node M—node K, with a path length of 3, where the path weight value of the path is a sum a4 of a flow direction weight value from node D to node I, a flow direction weight value from node I to node M, and a flow direction weight value from node M to node K; node E—node J—node I—node M—node K, with a path length of 4, where the path weight value of the path is a sum a5 of a flow direction weight value from node E to node J, a flow direction weight value from node J to node I, a flow direction weight value from node I to node M, and a flow direction weight value of node M and to node K; node F—node J—node I—node M—node K, with a path length of 4, where the path weight value of the path is a sum a6 of a flow direction weight value from node F to node J, a flow direction weight value from node J to node I, a flow direction weight value from node I to node M, and a flow direction weight value of node M and to node K.

The average value of the path lengths of all the six paths is (2+2+3+3+4+4)/6=3, which is the layer score of node K; the weighted average value of the path lengths of all the six paths is (a1+a2+a3+a4+a5+a6)/6, which may also be the layer score of node K.

Figure 4:
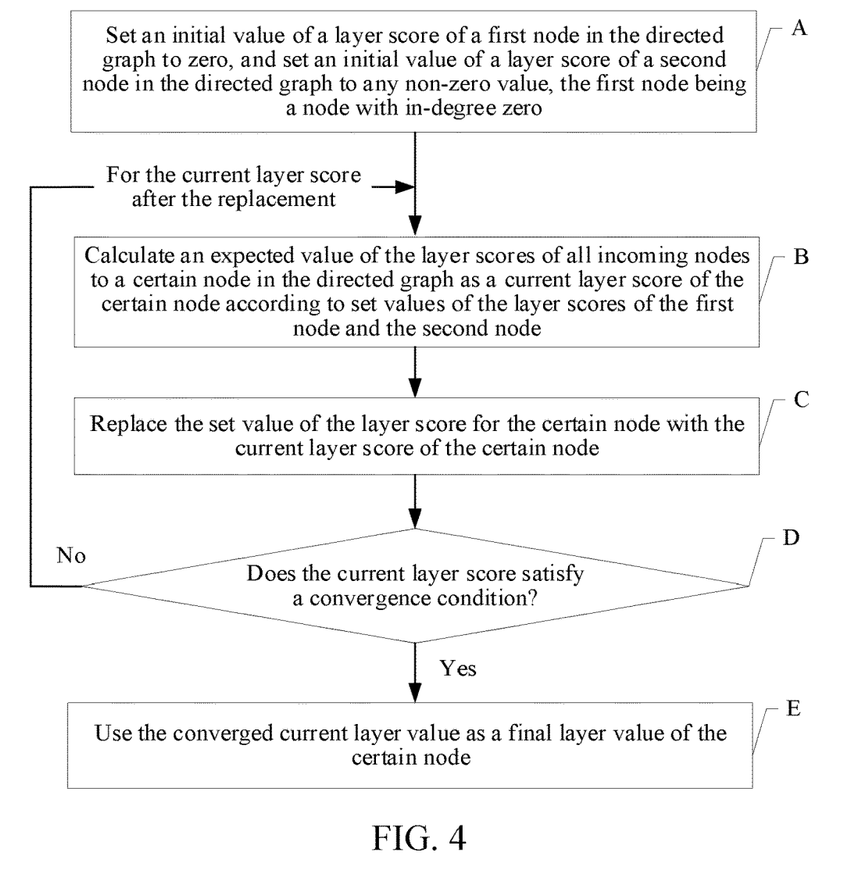
FIG. 4 is a flowchart of a method for calculating a layer score of a certain node according to an embodiment of this disclosure.

Alternatively, the layer score calculation function may include: the layer score of the any node is an expected value of the layer scores of all incoming nodes to the each node in the directed graph. The layer score calculation function may also be any other calculation function, which will not be described in detail herein. In this case, as shown in FIG. 4, the layer score of each node may be calculated by the following iterative calculation method:

A. Set an initial value of a layer score of a first node in the directed graph to zero, and set an initial value of a layer score of a second node in the directed graph to any non-zero value, e.g., −1, where the first node is a node with zero in-degree, and the second node is a node with non-zero in-degree.

B. Calculate an expected value of the layer scores of all incoming nodes to a certain node in the directed graph as a current layer score of the certain node according to set values of the layer scores of the first node and the second node.

C. Replace the set value of the layer score for the certain node with the current layer score of the certain node.

D. Determine whether the current layer score in the above step C satisfies a convergence condition; if the convergence condition is not satisfied, use the current layer score as the set value of the layer score of the certain node and perform the above steps B and C to perform the operation of calculating the current layer score of the certain node and the replacement operation; if the convergence condition is satisfied, perform step E.

E. Use the current layer score as a final layer score of the certain node.

The initial values may be preset, so the computer device may acquire the initial value of the layer score of the first node in the directed graph, and acquire the initial value of the layer score of the second node in the directed graph.

The convergence condition may include: when the times of replacement of the layer score of the certain node reaches at least one or a preset value or a minimum value, for example, when the times of replacement of the layer score of the certain node reaches the preset value, indicating that the cycle times of the steps B and C reach the preset value, the layer score obtained after the last replacement is used as the final layer score of the certain node. The convergence condition may also include: the current layer score after replacement reaches the minimum value, that is, convergence is reached.

In the first cycle of the above steps B and C, the set value of the layer score of the certain node is specifically the initial value of the layer score of the certain node; in the subsequent cycles, the set value of the layer score of the certain node is specifically the current layer score after replacement in the previous cycle. It can be seen that the layer score of each node can be obtained according to the iterative calculation method to obtain a final converged layer score.

(2) When the directed graph includes a directed cycle of a plurality of nodes, set the layer scores of the plurality of nodes to a same value. The layer scores of other nodes in the directed graph that do not form a directed cycle may be calculated according to the above-mentioned preset layer score calculation function, and the details will not be repeated here.

This method is equivalent to compressing a directed cycle into a node, which can effectively convert a non-acyclic graph (i.e., a directed cycle) into a DAG graph. For the DAG graph, the step of calculating the layer score of each node in the directed graph according to the preset layer score calculation function may be performed.

(3) When the directed graph includes a directed cycle of a plurality of nodes, remove path information between two nodes in the plurality of nodes to obtain an adjusted directed graph; and then calculate a layer score of each node in the adjusted directed graph according to the preset layer score calculation function. A path weight between the two nodes associated with the removed path information is a minimum path weight among path weights between any two nodes of the plurality of nodes.

The path information between two nodes is removed mainly by removing a directed edge between the two nodes in the directed graph, so that there is no directed cycle in the directed graph, thereby achieving the decomposition of the directed cycles, and effectively solving the self-reinforcing in the cycle caused by the iterative calculation of the layer score.

Therefore, based on the algorithms in (2) and (3), before processing a directed cycle, the apparatus for detecting a directed network may first determine whether the number of nodes in the directed cycle is greater than a preset value; if the number of nodes in the directed cycle is not greater than the preset value, the algorithm in (2) may be used for processing; if the number of nodes in the directed cycle is greater than the preset value, the algorithm in (3) may be used for processing. Alternatively, before processing a directed cycle, the apparatus for detecting a directed network first determines whether a flow direction weight variance of directed edges in the directed cycle is less than a preset value; if the flow direction weight variance is not less than the preset value, the algorithm in (3) is used for processing; if the flow direction weight variance in the directed cycle is less than the preset value, the algorithm in (2) may be used for processing.

In step 103, node types of the network nodes represented by the nodes in the to-be-detected directed network are determined according to the layer scores of the nodes respectively.

For example, according to the layer score of each node and a preset machine learning model, the node types of the network nodes represented by the nodes in the to-be-detected directed network are determined. The machine learning model is a learning model based on artificial intelligence (AI), which can be obtained through training with a certain method. The operation logic of the machine learning model is stored in advance in the apparatus for detecting a directed network.

AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

The AI technology is a comprehensive discipline, and relates to a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

ML is an interdisciplinarity involving a plurality of disciplines such as the probability theory, statistics, approximation theory, convex analysis, algorithm complexity theory, and the like. ML specializes in studying how a computer simulates or implements a human learning behavior to obtain new knowledge or skills, and reorganize an existing knowledge structure, so as to keep improving performance of the computer. ML is the core of AI, is a basic way to make the computer intelligent, and is applied to various fields of AI. ML and DL generally include technologies such as an artificial neural network, a belief network, reinforcement learning, transfer learning, inductive learning, and learning from demonstrations.

It can be seen that in the method of this embodiment, an apparatus for detecting a directed network first acquires flow direction feature information of data traffic between network nodes in a to-be-detected directed network, the flow direction feature information including a directed graph; then calculates layer scores of nodes in the directed graph to represent an average path length of all paths between peripheral nodes and each node in the directed graph; and determines node types of the network nodes represented by the nodes in the to-be-detected directed network according to the layer scores of the nodes respectively. In this way, the sequence of the nodes in the directed graph are quantified by layer scores. The calculation of the layer score of each node can comprehensively consider all paths to each network node in the directed network, so that the calculated layer scores can more accurately reflect the rankings of the network nodes, and the node type of each network node can be determined more accurately. In addition, the method of calculating the layer score in the embodiments of this disclosure is well suited for directed graphs including a directed cycle, and particular processing only needs to be performed on nodes in the directed cycle.

Figure 5:
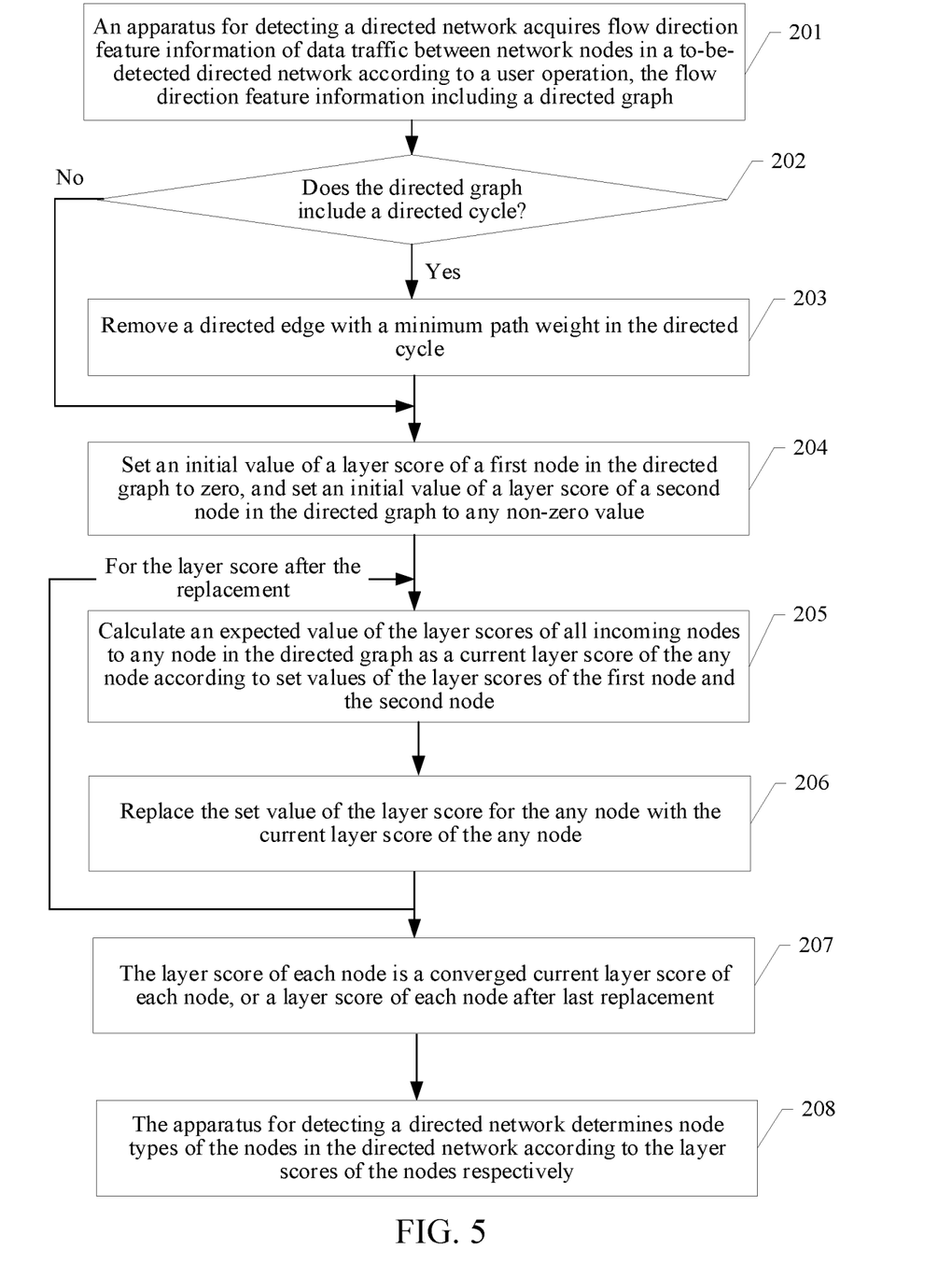
FIG. 5 is a flowchart of a method for detecting a directed network according to an application embodiment of this disclosure.

The method for detecting a directed network in this disclosure is described below with reference to an exemplary application embodiment. In this embodiment, a KLayer algorithm is used as the preset layer score calculation function. Specifically, as shown in FIG. 5, the method of this embodiment may be implemented by the following steps.

In step 201, a user can operate an apparatus for detecting a directed network, and cause the apparatus for detecting a directed network to acquire flow direction feature information of data traffic between network nodes in a to-be-detected directed network according to a user operation, where the flow direction feature information includes a directed graph GraphG (V, E, W), where G represents the directed network, such as a fund transaction network, a node $v_i \in V$ represents an application terminal of a user, and the number of nodes is N; a directed edge $e_{ij} \in E$ represents a data flow direction from the application terminal of user $v_i$ to the application terminal of user $v_j$, e.g., payment behavior, and the number of directed edges is M; $w_{ij} \in W$ represents a path weight of the directed edge $e_{ij}$, e.g., the amount of transaction or the number of transactions, and $w_{ij}$ may not equal. The flow direction feature information includes a directed graph GraphG (V, E, W), where G represents a directed network, such as a fund transaction network, etc., the node represents the user's application terminal, the number of nodes is N; the directed edge represents the data flow direction of the user's application terminal, such as payment behavior, the number of directed edges is M; it is the path weight of directed edges, such as transaction amount or number of transactions, which is not necessarily equal.

In step 202, the apparatus for detecting a directed network first determines whether the directed graph includes a directed cycle; if yes, perform step 203; if not, perform step 204.

In step 203, the apparatus for detecting a directed network removes a directed edge with a minimum path weight in the directed cycle, that is, removes path information between two nodes to break the cycle, and then performs step 204 for the nodes in the directed graph obtained after the directed edge is removed.

In other specific embodiments, the apparatus for detecting a directed network may set the layer scores of all nodes in the directed cycle to a same value, that is, perform an operation of compressing the cycle, and then performs step 204 for other nodes that do not belong to the directed cycle.

In step 204, the apparatus for detecting a directed network calculates the layer score of each by using a preset KLayer algorithm. First, an initial value of a layer score of a first node with zero in-degree in the directed graph is set to zero, that is, $L_v^{(0)}=0$, and an initial value of a layer score of a second node different from the first node is set to any value, for example, $L_v^{(0)}=-1$. For example, all the nodes in the directed graph are classified into two types of nodes. One type of node is nodes with zero in-degree, that is, the first nodes, and the initial value of the layer score of this type of node may be set to zero. The other type of node is nodes with non-zero in-degree, that is, the second nodes, and the initial value of the layer score of this type of node may be set to any value, for example, −1.

In step 205, an expected value of the layer scores of all incoming nodes to a certain node in the directed graph as a current layer score of the certain node is calculated according to set values of the layer scores of the first node and the second node.

All incoming nodes of any node refer to all neighbor nodes pointing to the any node. For example, in a directed graph, there is a path from node A to node B and then to node C and another path from node D to node E and then to node C. In this case, all incoming nodes of node C are node B and node E. Through the above step 204, each node in the directed graph has an initial value of the layer score, that is, a set value of the layer score. In this way, the current layer score of any node C is specifically an expected value of the layer scores of node B and node E, and may be specifically calculated by the following formula 1.

The layer score of any node may be expressed by the following formula 1, where N(v) represents a set of neighbor nodes pointing to node v:

$$L_v^{(k)} = E\{(L_i^{(k-1)} + 1)|i \in N(v)\} \qquad (1)$$
$$= \frac{\sum_{i \in N(v)} (L_i^{(k-1)} + 1)}{|N(v)|}$$

In step 206, the set value of the layer score of each node with the current layer score of the each node calculated in the above step 205 is replaced, and the method returns to step 205 for the replaced layer score of each node.

Steps 205 and 206 are executed cyclically, until the calculated current layer score of each node reaches convergence, or until the number of times of replacement of the layer score of each node reaches a preset value (that is, the number of cycles reaches a preset value). Then step 207 is performed.

In step 207, the finally calculated layer score of each node is a converged current layer score of each node, or a layer score of each node after last replacement. If the layer score of each node calculated after multiple cycles reaches a minimum, the current layer score of each node reaches convergence.

Specifically, the above steps 204 to 206 may be implemented by pseudocode in Table 1 below:

TABLE 1

Input: GraphG (V, E, W), max iteration K;
Output: Layer score $L_v \in R, \forall v \in V$
Procedure:
1. $\forall v \in V$, Initialize $$L_v^{(0)} = \begin{cases} -1, & \text{in deg}(v) > 0 \\ 0, & \text{in deg}(v) = 0 \end{cases}$$

2. For k = 1, . . . , Kdo $$L_v^{(k)} = E\{(L_i^{(k-1)} + 1) \mid i \in N(v)\}$$

$$= \frac{\sum_{i \in N(v)} (L_i^{(k-1)} + 1)}{|N(v)|}$$

end for
3. Return$\{L_v^{(k)}, \forall v \in V\}$

In step 208, the apparatus for detecting a directed network determines node types of the nodes in the directed network according to the layer scores of the nodes respectively.

It can be seen that in this embodiment, through the preset KLayer algorithm, a non-negative rational number is output for each node in the directed graph as the layer score, to distinguish the average rankings of nodes in the directed network. In this process, the KLayer algorithm can be applied to non-DAG graphs through the methods of compressing cycles and breaking cycles. Therefore, the method in this embodiment is applicable to both DAG graphs and non-DAG graphs.

In specific applications, the method in this embodiment can be applied to any directed network, for example, may be applied in the process of business model mining to distinguish the agent levels in the agent distribution model. Based on the above method, first, flow direction feature information of data traffic between network nodes in a business model system is acquired, where the flow direction feature information is specifically a directed graph; next, layer scores of nodes in the directed graph are calculated; then, node types of the network nodes represented by the nodes in the business model system are determined according to the layer scores of the nodes, that is, levels of the network nodes in the agent distribution system are determined.

In another example, the method in this embodiment may be applied in financial risk control products to detect illegal network nodes. Based on the above method, first, flow direction feature information of data traffic between network nodes in a financial risk control system is acquired, where the flow direction feature information is specifically a directed graph; next, layer scores of nodes in the directed graph are calculated; then, node types of the network nodes represented by the nodes in the financial risk control system are determined according to the layer scores of the nodes, that is, it is determined whether the network nodes are illegal.

Figure 6:
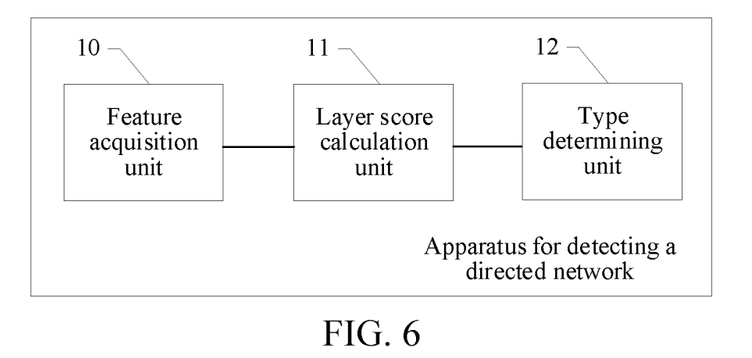
FIG. 6 is a schematic structural diagram of an apparatus for detecting a directed network according to an embodiment of this disclosure.

An embodiment of this disclosure further provides an apparatus for detecting a directed network. FIG. 6 shows a schematic structural diagram of this apparatus. This apparatus may specifically include a feature acquisition unit 10, a layer score calculation unit 11, and the type determination unit.

The feature acquisition unit 10 is configured to acquire flow direction feature information of data traffic between network nodes in a to-be-detected directed network, the flow direction feature information including a directed graph, and any node in the directed graph representing one network node. One or more modules, submodules, and/or units of the apparatus can be implemented by processing circuitry, software, or a combination thereof, for example.

The layer score calculation unit 11 is configured to calculate a layer score of each node in the directed graph acquired by the feature acquisition unit 10 according to a preset layer score calculation function when the directed graph does not include any directed cycle, the layer score of any node in the directed graph being used for representing an average path length of all paths from peripheral nodes in the directed graph to the any node.

The preset layer score calculation function includes: the layer score of any node is an average length value of all paths from the peripheral nodes in the directed graph to the any node, or is a function-calculated value of lengths of all paths from the peripheral nodes in the directed graph to the any node. Alternatively, the preset layer score calculation function includes: the layer score of the any node is: an expected value of the layer scores of all incoming nodes to the each node in the directed graph.

Further, the layer score calculation unit 11 is further configured to, in the process of calculating the layer score of a certain node in the directed graph according to the preset layer score calculation function, set an initial value of a layer score of a first node in the directed graph to zero, and set an initial value of a layer score of a second node in the directed graph to any non-zero value, the first node being a node with zero in-degree, and the second node being a node with non-zero in-degree; calculate an expected value of the layer scores of all incoming nodes to a certain node in the directed graph as a current layer score of the certain node according to set values of the layer scores of the first node and the second node, the set value of the layer score including the initial value of the layer score; replace the set value of the layer score for the certain node with the current layer score of the certain node; use the current layer score as a final layer score of the certain node when the current layer score of the certain node satisfies a preset convergence condition; and use the current layer score as the set value of the layer score of the certain node and perform the operation of calculating the current layer score of the certain node and the replacement operation, when the current layer score of the certain node does not meet the preset convergence condition.

Further, the layer score calculation unit 11 is further configured to: when the directed graph includes a directed cycle of a plurality of nodes, set the layer scores of the each plurality of nodes to a same value.

Further, the layer score calculation unit 11 is further configured to: when the directed graph includes a directed cycle of a plurality of nodes, remove path information between two nodes in the each plurality of nodes to obtain an adjusted directed graph, a path weight between the two nodes being a minimum path weight among path weights between any two nodes of the plurality of nodes; and calculate a layer score of each node in the adjusted directed graph according to a preset layer score calculation function.

The type determination unit 12 is configured to determine node types of the network nodes represented by the nodes in the to-be-detected directed network according to the layer scores of the nodes calculated by the layer score calculation unit 11 respectively.

In the apparatus of this embodiment, the feature acquisition unit 10 first acquires flow direction feature information of data traffic between network nodes in a to-be-detected directed network, the flow direction feature information including a directed graph; then the layer score calculation unit 11 calculates layer scores of nodes in the directed graph to represent an average path length of all paths between peripheral nodes and each node in the directed graph; and the type determination unit 12 determines node types of the network nodes represented by the nodes in the to-be-detected directed network according to the layer scores of the nodes respectively. In this way, the sequence of the nodes in the directed graph are quantified by layer scores. The calculation of the layer score of each node can comprehensively consider all paths to each network node in the directed network, so that the calculated layer scores can more accurately reflect the rankings of the network nodes, and the node type of each network node can be determined more accurately. In addition, the method of calculating the layer score in the embodiments of this disclosure is well suited for directed graphs including a directed cycle, and particular processing only needs to be performed on nodes in the directed cycle.

Figure 7:
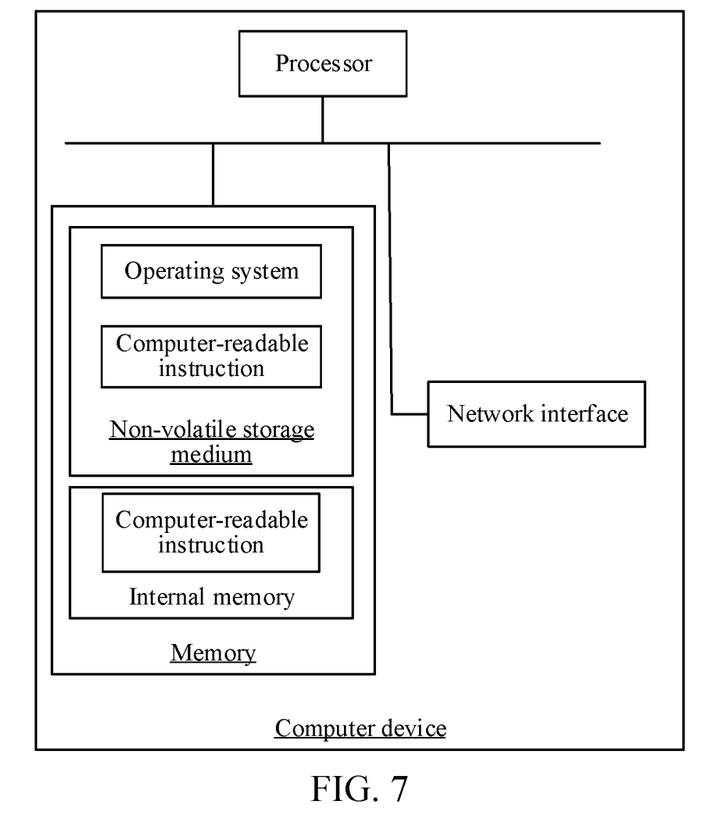
FIG. 7 is a schematic structural diagram of a terminal device according to an embodiment of this disclosure.

An embodiment of this disclosure further provides a computer device, which may be a server, a schematic structural diagram of which is shown in FIG. 7. FIG. 11 is a diagram of an internal structure of a computer device in some embodiments. As shown in FIG. 11, the computer device includes a processor, a memory, and a network interface connected by a system bus. The memory includes a non-volatile storage medium and an internal memory. The non-volatile storage medium of the computer device stores an operating system, and may further store computer-readable instructions. The computer-readable instructions, when executed by the processor, may cause the processor to perform the method for detecting a directed network. The internal memory may also store computer-readable instructions, and the computer-readable instructions, when executed by a processor, may cause the processor to perform the method for detecting a directed network.

A person skilled in the art may understand that, the structure shown in FIG. 11 is only a block diagram of a part of a structure correlated to a solution of this disclosure and does not limit the computer device to which the solution of this disclosure is applied. Specifically, the computer device may include more or fewer members than those in the drawings, or include a combination of some members, or include different member layouts.

In some embodiments, a computer-readable storage medium such as a non-transitory computer-readable storage medium is provided. The computer-readable storage medium stores computer-readable instructions, the computer-readable instructions, when executed by the processor, causing the processor to perform the steps in the above method for detecting a directed network. The steps of the method for detecting a directed network may be the steps in the methods in the foregoing embodiments.

An embodiment of this disclosure further provides a storage medium, the storage medium storing a plurality of instructions, and the instructions being adapted to be loaded by a processor to perform the method for detecting a directed network performed by the apparatus for detecting a directed network.

An embodiment of this disclosure further provides a terminal device, including processing circuitry, such as a processor, and a storage medium. The storage medium is configured to store a plurality of instructions, the instructions being loaded by a processor to perform the method for detecting a directed network performed by the apparatus for detecting a directed network. The processor is configured to implement instructions in the plurality of instructions.

In some embodiments, a computer program product or a computer program is provided, including computer instructions, the computer instructions being stored in a computer-readable storage medium. A processor of a computer device reads the computer instructions from the computer-readable storage medium, and executes the computer instructions, so that the computer device performs the blockchain-based resource transfer method provided in the foregoing optional implementations.

It is to be understood that although the steps in the flowcharts of the embodiments of this disclosure are displayed in sequence according to arrows, the steps are not necessarily performed in the sequence indicated by the arrows. Unless otherwise explicitly specified in this disclosure, execution of the steps is not strictly limited, and the steps may be performed in other sequences. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. References to the memory, the storage, the database, or other media used in the embodiments provided in this disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The method for detecting a directed network, the computer-readable storage medium, and the related device provided in the embodiments of this disclosure are described above in detail. Although the principles and implementations of this disclosure are described by using specific examples in this specification, the descriptions of the foregoing embodiments are merely intended to help understand the method and the core idea of the method of this disclosure. Meanwhile, a person of ordinary skill in the art may make modifications to the specific implementations and application range according to the idea of this disclosure. In conclusion, the content of this specification is not to be construed as a limitation to this disclosure.

What is claimed is:

1. A method for detecting node types in a directed network, the method comprising:
    acquiring flow direction feature information of data traffic between network nodes in the directed network, the flow direction feature information including a directed graph of nodes representing the network nodes, the nodes in the directed graph being connected via directed edges, the nodes in the directed graph including peripheral nodes and non-peripheral nodes, wherein each peripheral node is a start point of each directed edge associated with the respective peripheral node, each non-peripheral node is an end point of a directed edge associated with the respective non-peripheral node;
    determining, by processing circuitry, layer scores of the nodes in the directed graph that is included in the flow direction feature information, the layer scores of the nodes being determined based on whether the directed graph includes a directed cycle, a layer score of a first one of the non-peripheral nodes being determined based on a plurality of lengths of paths from respective first peripheral nodes in the peripheral nodes to the first one of the non-peripheral nodes, wherein the paths have a same end point that is the first one of the non-peripheral nodes; and
    determining the node types of the network nodes represented by the nodes in the directed network according to the layer scores of the determined nodes, wherein
    the determination of at least one of the layer scores of the nodes in response to the directed graph including the directed cycle is different from the determination of the at least one of the layer scores of the nodes in response to the directed graph not including the directed cycle,
    in response to the directed graph including the directed cycle of a plurality of the nodes, the layer scores of the plurality of the nodes are determined based on a number of the plurality of the nodes and a node number threshold, and
    in response to the directed graph not including any directed cycle, the layer score of each remaining non-peripheral node of the nodes in the directed graph is determined based on lengths of paths from the peripheral nodes of the nodes in the directed graph to the respective remaining non-peripheral node, the non-peripheral nodes including the remaining non-peripheral nodes and the first one of the non-peripheral nodes.

2. The method according to claim 1, wherein
    for the first one of the non-peripheral nodes, an average length value of the plurality of lengths of paths from the respective first peripheral nodes in the directed graph to the first one of the non-peripheral nodes is calculated to obtain the layer score of the first one of the non-peripheral nodes in the directed graph.

3. The method according to claim 1, wherein
    for the first one of the non-peripheral nodes,
    a sum of flow direction weight values corresponding to each of the plurality of lengths of paths from the respective first peripheral nodes in the directed graph to the first one of the non-peripheral nodes is calculated to obtain a path weight value; and
    an average value of the path weight values of the plurality of lengths of paths is calculated to obtain the layer score of the first one of the non-peripheral nodes in the directed graph.

4. The method according to claim 1, wherein the layer score of each of the remaining non-peripheral nodes is an expected value of the layer scores of all incoming nodes of the nodes in the directed graph to the respective remaining non-peripheral node in the directed graph.

5. The method according to claim 4, wherein the determining the layer scores of the remaining non-peripheral nodes comprises:
    acquiring an initial value of a layer score of a first node of the nodes in the directed graph, and acquiring an initial value of a layer score of a second node of the nodes in the directed graph, the initial value of the first node being zero, the initial value of the second node being a non-zero value, the first node being a peripheral node having a zero in-degree, and the second node being a non-peripheral node having a non-zero in-degree;
    calculating an expected value of the layer scores of all incoming nodes of the nodes to a certain non-peripheral node of the nodes in the directed graph as a current layer score of the certain non-peripheral node according to set values of the layer scores of the first node and the second node, the set value of the layer score including the initial value of the layer score;
    replacing the set value of the layer score for the certain non-peripheral node with the current layer score of the certain non-peripheral node; and
    using the current layer score as a final layer score of the certain non-peripheral node when the current layer score of the certain non-peripheral node satisfies a preset convergence condition.

6. The method according to claim 5, wherein the determining the layer scores of the remaining non-peripheral nodes in the directed graph comprises:
    using the current layer score as the set value of the layer score of the certain non-peripheral node and performing the calculating the current layer score of the certain non-peripheral node and the replacing, when the current layer score of the certain non-peripheral node does not meet the preset convergence condition.

7. The method according to claim 1, wherein the determining the layer scores comprises:
    when the directed graph includes the directed cycle of the plurality of the nodes and the number of the plurality of the nodes is less than or equal to the node number threshold,
        setting the layer scores of the plurality of the nodes to a same value to compress the directed cycle into one node and obtain an adjusted directed graph; and
        calculating the layer score of the first one of the non-peripheral nodes based on the plurality of lengths of paths and the adjusted plurality of lengths of paths.

8. The method according to claim 1, wherein the determining the layer scores comprises:
    when the directed graph includes the directed cycle of the plurality of the nodes and the number of the plurality of the nodes is greater than the node number threshold,
        removing path information between two nodes in the plurality of the nodes to obtain an adjusted directed graph, a path weight between the two nodes being a minimum path weight among path weights between any two nodes of the plurality of the nodes; and calculating the layer score of the first one of the non-peripheral nodes based on the plurality of lengths of paths and the adjusted directed graph.

9. An apparatus, comprising:
hardware processing circuitry configured to:
acquire flow direction feature information of data traffic between network nodes in a directed network, the flow direction feature information including a directed graph of nodes representing the network nodes, the nodes in the directed graph being connected via directed edges, the nodes in the directed graph including peripheral nodes and non-peripheral nodes, wherein each peripheral node is a start point of each directed edge associated with the respective peripheral node, each non-peripheral node is an end point of a directed edge associated with the respective non-peripheral node;
determine layer scores of the nodes in the directed graph that is included in the flow direction feature information, the layer scores of the nodes being determined based on whether the directed graph includes a directed cycle, a layer score of a first one of the non-peripheral nodes being determined based on a plurality of lengths of paths from respective first peripheral nodes in the peripheral nodes to the first one of the non-peripheral nodes, wherein the paths have a same end point that is the first one of the non-peripheral nodes; and
determine node types of the network nodes represented by the nodes in the directed network according to the layer scores of the determined nodes, wherein
the determination of at least one of the layer scores of the nodes in response to the directed graph including the directed cycle is different from the determination of the at least one of the layer scores of the nodes in response to the directed graph not including the directed cycle,
in response to the directed graph including the directed cycle of a plurality of the nodes, the layer scores of the plurality of the nodes are determined based on a number of the plurality of the nodes and a node number threshold, and
in response to the directed graph not including any directed cycle, the layer score of each remaining non-peripheral node of the nodes in the directed graph is determined based on lengths of paths from the peripheral nodes of the nodes in the directed graph to the respective remaining non-peripheral node, the non-peripheral nodes including the remaining non-peripheral nodes and the first one of the non-peripheral nodes.

10. The apparatus according to claim 9, wherein the hardware processing circuitry is configured to:
calculate, for the first one of the non-peripheral nodes, an average length value of the plurality of lengths of paths from the respective first peripheral nodes in the directed graph to the first one of the non-peripheral nodes to obtain the layer score of the first one of the non-peripheral nodes in the directed graph.

11. The apparatus according to claim 9, wherein the hardware processing circuitry is configured to:
for the first one of the non-peripheral nodes,
calculate a sum of flow direction weight values corresponding to each of the plurality of lengths of paths from the respective first peripheral nodes in the directed graph to the first one of the non-peripheral nodes to obtain a path weight value; and calculate an average value of the path weight values of the plurality of lengths of paths to obtain the layer score of the first one of the non-peripheral nodes in the directed graph.

12. The apparatus according to claim 9, wherein the layer score of each of the remaining non-peripheral nodes is an expected value of the layer scores of all incoming nodes of the nodes in the directed graph to the respective remaining non-peripheral node in the directed graph.

13. The apparatus according to claim 12, wherein the hardware processing circuitry is configured to:
acquire an initial value of a layer score of a first node of the nodes in the directed graph, and acquire an initial value of a layer score of a second node of the nodes in the directed graph, the initial value of the first node being zero, the initial value of the second node being a non-zero value, the first node being a peripheral node having a zero in-degree, and the second node being a non-peripheral node having a non-zero in-degree;
calculate an expected value of the layer scores of all incoming nodes of the nodes to a certain non-peripheral node of the nodes in the directed graph as a current layer score of the certain non-peripheral node according to set values of the layer scores of the first node and the second node, the set value of the layer score including the initial value of the layer score;
replace the set value of the layer score for the certain non-peripheral node with the current layer score of the certain non-peripheral node; and
use the current layer score as a final layer score of the certain non-peripheral node when the current layer score of the certain non-peripheral node satisfies a preset convergence condition.

14. The apparatus according to claim 13, wherein the hardware processing circuitry is configured to:
use the current layer score as the set value of the layer score of the certain non-peripheral node and perform the calculation of the current layer score of the certain non-peripheral node and the replacement, when the current layer score of the certain non-peripheral node does not meet the preset convergence condition.

15. The apparatus according to claim 9, wherein the hardware processing circuitry is configured to:
when the directed graph includes the directed cycle of the plurality of the nodes and the number of the plurality of the nodes is less than or equal to the node number threshold,
set the layer scores of the plurality of the nodes to a same value to compress the directed cycle into one node and obtain an adjusted directed graph; and
calculate the layer score of the first one of the non-peripheral nodes based on the plurality of lengths of paths and the adjusted plurality of lengths of paths.

16. The apparatus according to claim 9, wherein the hardware processing circuitry is configured to:
when the directed graph includes the directed cycle of the plurality of the nodes and the number of the plurality of the nodes is greater than the node number threshold,
remove path information between two nodes in the plurality of the nodes to obtain an adjusted directed graph, a path weight between the two nodes being a minimum path weight among path weights between any two nodes of the plurality of the nodes; and
calculate the layer score of the first one of the non-peripheral nodes based on the plurality of lengths of paths and the adjusted directed graph.

17. A non-transitory computer-readable storage medium storing instructions which when executed by at least one processor cause the at least one processor to perform:
- acquiring flow direction feature information of data traffic between network nodes in a directed network, the flow direction feature information including a directed graph of nodes representing the network nodes, the nodes in the directed graph being connected via directed edges, the nodes in the directed graph including peripheral nodes and non-peripheral nodes, wherein each peripheral node is a start point of each directed edge associated with the respective peripheral node, each non-peripheral node is an end point of a directed edge associated with the respective non-peripheral node;
- determining layer scores of the nodes in the directed graph that is included in the flow direction feature information, the layer scores of the nodes being determined based on whether the directed graph includes a directed cycle, a layer score of a first one of the non-peripheral nodes being determined based on a plurality of lengths of paths from respective first peripheral nodes in the peripheral nodes to the first one of the non-peripheral nodes, wherein the paths have a same end point that is the first one of the non-peripheral nodes; and
- determining node types of the network nodes represented by the nodes in the directed network according to the layer scores of the determined nodes, wherein
- the determination of at least one of the layer scores of the nodes in response to the directed graph including the directed cycle is different from the determination of the at least one of the layer scores of the nodes in response to the directed graph not including the directed cycle,
- in response to the directed graph including the directed cycle of a plurality of the nodes, the layer scores of the plurality of the nodes are determined based on a number of the plurality of the nodes and a node number threshold, and
- in response to the directed graph not including any directed cycle, the layer score of each remaining non-peripheral node of the nodes in the directed graph is determined based on lengths of paths from the peripheral nodes of the nodes in the directed graph to the respective remaining non-peripheral node, the non-peripheral nodes including the remaining non-peripheral nodes and the first one of the non-peripheral nodes.

* * * * *